United States Patent [19]

Jaumann et al.

[11] 4,447,033
[45] May 8, 1984

[54] WEIGHT BALANCER

[75] Inventors: Leonhard Jaumann; Zdenek Tima; Heinz Feierlein, all of Munich, Fed. Rep. of Germany

[73] Assignee: Sachtler GmbH Filmtechnische Gerate, Fed. Rep. of Germany

[21] Appl. No.: 281,601

[22] Filed: Jul. 9, 1981

[30] Foreign Application Priority Data

Jul. 11, 1980 [DE] Fed. Rep. of Germany ....... 3026379

[51] Int. Cl.³ ............................................ F16M 13/00
[52] U.S. Cl. .................................... 248/563; 248/566; 267/154; 403/93; 403/328
[58] Field of Search ............... 248/563, 561, 565, 566, 248/577, 578, 185, 183, 123.1, 162.1, 516; 267/154, 140.5, 140.3; 403/328, 93

[56] References Cited

U.S. PATENT DOCUMENTS

| 3,823,903 | 7/1974 | Kendall et al. | 248/563 |
| 3,970,274 | 7/1976 | Resk | 248/185 |
| 3,970,792 | 7/1976 | Benham et al. | 248/183 |
| 4,247,069 | 1/1981 | Kurz | 248/185 |

FOREIGN PATENT DOCUMENTS 7618433  6/1976  Fed. Rep. of Germany.

Primary Examiner—Ramon S. Britts
Assistant Examiner—Ramon O. Ramirez
Attorney, Agent, or Firm—Hayes, Davis & Soloway

[57] ABSTRACT

In a mechanism or support for a television or movie camera which allows the camera to be tilted or pitched upwardly and downwardly, the weight of torque offered by the camera is counterbalanced by means of a series of accumulators or spring elements placed between the rotatable support for the camera and the stator portion of the support and adapted to be selectively engaged between the rotor and stator, depending upon the weight of the camera being used. Preferably each accumulator offers a restoring torque that is different from that of the other accumulators such that by selective engagement of various combinations of accumulators many different weights of cameras can be accommodated.

9 Claims, 6 Drawing Figures

FIG. 3
FIG. 4
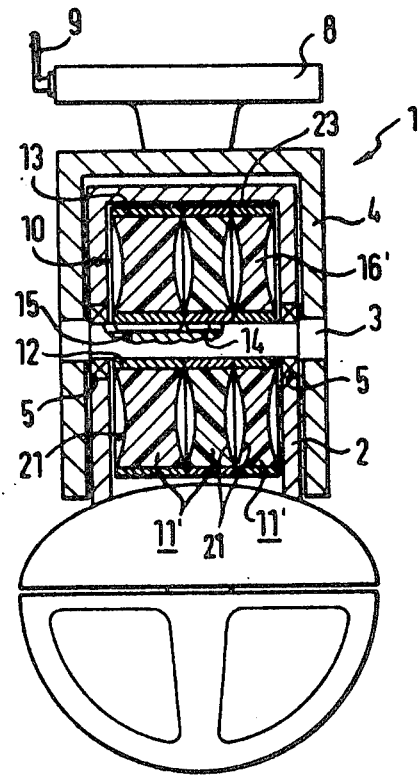
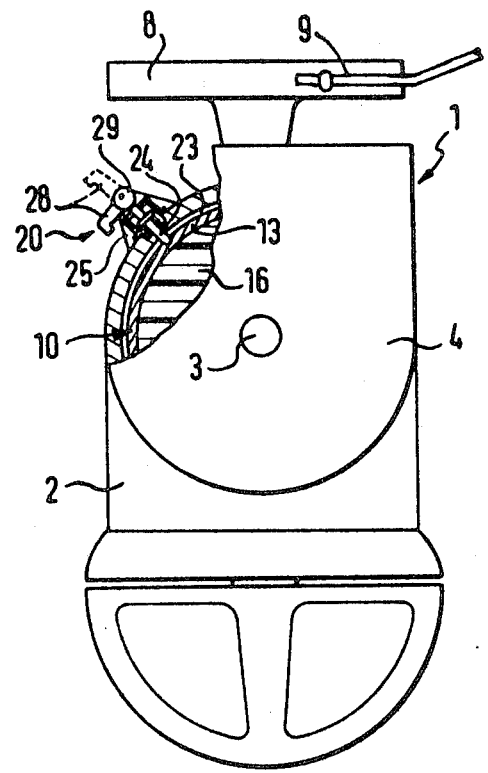
FIG. 5
FIG. 6
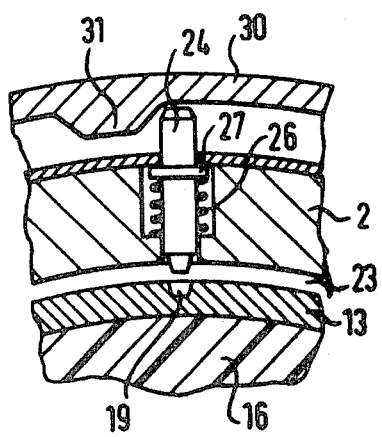
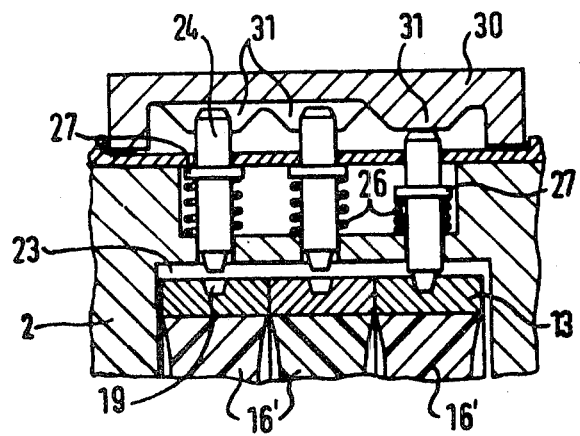

WEIGHT BALANCER

This invention is a device for balancing the weight of an apparatus such as a camera mounted on a tripod or stand as the camera is rotated upwardly or downwardly on the tripod. The device of this invention includes a stator and a rotor pivotable around the stator in the direction of camera motion, and has disposed between the stator and rotor a series of accumulators or spring members that exert upon the rotor during a tilting movement of the camera a restoring torque corresponding to the force offered by the camera.

In a weight compensating device of this kind, such as a tripod head for a film or television camera, it is desired that the camera be fully counterbalanced during its tilting or pitching movement to each position, i.e., that the counterbalancer produce a restoring torque that corresponds substantially to the torque given by the camera in its pitched position. The camera thus remains in its pitched position without the need to apply a restraining force and can be facilely and readily moved to its next position. The force needed to move the camera is relatively small and the camera moves uniformly over the range of movement of the camera with camera motion being smooth and consistent.

The balancing of the camera weight in the past consisted of disposing around the pitch axis a takeup spring adapted to counteract the weight of the camera. In heavy tripod heads for film camera, as weight balancing a torsion bar may be inserted in the tripod head instead of a spring.

Such balancers, springs or torsion bars are designed for a specific weight of camera. To be able to work on such a tripod head with film or television cameras of different weights, it is necessary to replace the counterbalance each time a camera of different weight is to be used. This operation can be complicated and time-consuming.

It has been suggested to construct a spring-type balancer as an independent cassette which can be connected by a simple clamp to the tripod head for a film or television camera. See German Pat. No. 2,717,772. According to this patent, several balancing cassettes adapted to different weights of the cameras are kept on hand and are individually attached to the tripod as needed according to the weight of the camera to be used.

The present invention is directed to the problem of providing for a tilting head tripod a balancer of simple construction which can be quickly adjusted to different weights of cameras. According to this invention a balancer has several independent accumulators or tensioning members that can be selectively and readily operatively engaged between the stator and rotor of the tripod to adjust the counterbalancing force. For example, if three independent accumulators are provided in the balancer according to this invention, by selectively engaging various combinations of the three, it is possible to provide seven different restoring torques corresponding to seven different weights of cameras.

In one embodiment of the invention, the individual accumulators are spring elements arranged side by side on a horizontal shaft supported on a stator. Each spring is connected to the shaft at one end. The other end of the spring is adapted to be selectively interlocked with a part of the tripod that does not rotate with the shaft. Each accumulator preferably has an inner ring that can be slipped on the pitch shaft to lock and rotate therewith, a concentric outer ring and a spring or tensioning element disposed between the two rings. The spring can be a simple coil spring inserted between the two rings. It is preferred, however, to connect the two rings with a rubber or elastic disk. The hardness of the elastic material, generally referred to below as a rubber, and the dimensions of the individual accumulators, are adapted to accommodate the expected weights of the cameras to be used.

The accumulators preferably have a wheel configuration. The rubber material between the inner and outer rings can be of uniform thickness, i.e., can have straight or planar side walls, but according to a preferred embodiment, the side walls are thinner or taper in the central area between the inner and outer rings. With this design, a larger angle of rotation of the accumulator, i.e., of the outer ring relative to the inner ring, is permitted so as to enlarge the range of movement of the tripod head. The rubber ring may also have bores or cutouts in the central portion to permit an increased angle of rotation.

To selectively engage the individual accumulators with the stator and rotor components of the tripod, there are provided bolts or locking pins which can be operated by eccentrics to engage one or more of the accumulators as desired. All of the locking pins can be operated by a single handle which where moved to different positions can bring into play any desired combination of the locking pins.

THE DRAWINGS

In the drawings:

FIG. 3 is a longitudinal section through a tripod head for a film or television camera having a balancer according to this invention with several accumulators that can be selectively independently engaged;

FIG. 4 is a side view partly in section of the tripod head with the balancer shown in FIG. 3;

Figure 1:
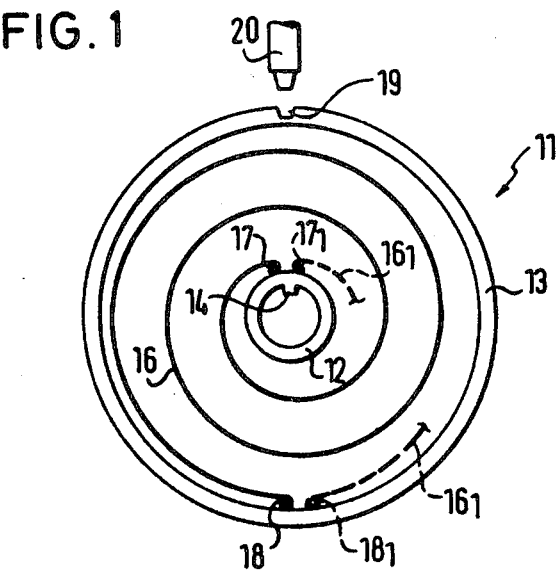
FIG. 1 illustrates in plane view an individual accumulator to be used in a balancer according to the invention.

FIG. 5 is a partial cross section through a modified balancer according to the sectional view in FIG. 4, wherein the individual accumulator of the balancer can be engaged with a single or common operating handle and a series of locking pins; and FIG. 6 is a cross section through the operating handle and a part of the balancer shown in FIG. 5 and illustrates the interlocking of the individual accumulators.

FIG. 3 shows a tripod head 1 for a film or television camera. The tripod head has a stator 2 connected to a base, which is only partially indicated as a semi-spherical member to be mounted on the remainder of the tripod. A rotor 4 of U-shaped cross section is attached to a rotor shaft 3 which in turn is rotatably supported in stator 2 by ball bearings 5,. Rotor 4 carries on its top side a receiving plate 8 to which a film or television camera (not shown) is secured. Handle 9, secured to the receiving plate 8, is used to pivot the rotor. A balancer 10 is situated between stator 2 and rotor 4. When rotor 4 pivots with the camera secured thereon, balancer 10 serves to deliver a restoring force that is about equal and opposite to the torque exerted by the camera. The balancer has three accumulators 11 although more or less can be used. Each has a wheel-like shape and is placed upon shaft 3.

Figure 2:
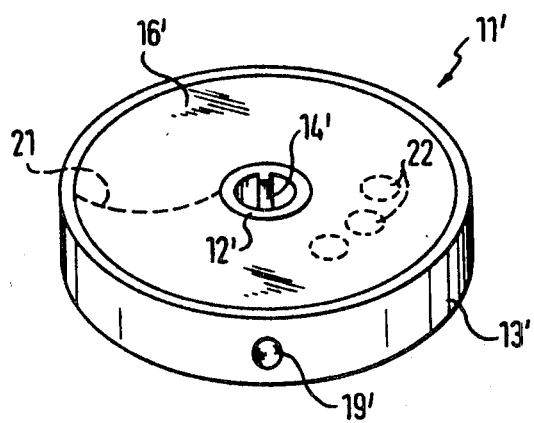
FIG. 2 is a perspective view of another individual accumulator to be used in a balancer according to this invention.

Two different embodiments of individual accumulators 11 are illustrated in FIGS. 1 and 2.

In FIG. 1, accumulator 11 has an inner ring 12 and an outer ring 13, both of aluminum. Ring 12 is slipped on the rotor shaft 3 and is interlocked therewith by projection 14 that fits in groove 15 in rotor shaft 3, locking ring 12 against rotation about the shaft. Between inner ring 12 and outer ring 13 is a spiral spring 16 held at one end 17 on ring 12 and at the other end 18 on ring 13. In FIG. 1 spiral spring 16 is wound counterclockwise. The accumulator has a second spiral spring $16_1$ wound in the opposite direction and attached at points $17_1$ and $18_1$ on rings 12 and 13, respectively.

If the inner ring 12 of the accumulator 11 is fixed and if outer ring 13 is rotated, then the spring 16, or the two springs 16 and $16_1$, exert on the outer ring 13 a restoring torque that tends to return the outer ring 13 to its resting position.

Ring 13 has on its outer surface a recess 19. Ring 13 can be connected to the stator 2 by means of locking element 20 engaging recess 19. When accumulator 11 in FIG. 1 is slipped on rotor shaft 3 as illustrated in FIG. 3 and ring 13 is locked with the stator 2 by locking element 20, then, upon rotation of the rotor 4 with the superposed camera, there is produced a restoring torque that by proper selection of the strength or size of spiral ring 16 corresponds to the torque of the camera but is opposite to it.

In FIG. 2, accumulator 11' has an inner ring 12' with a projection 14' that meshes in the groove 15 of the rotor shaft 3 and an outer ring 13' having a recess 19' to receive the locking pin. A rubber ring or disk 16' is bonded to the two rings. Techniques for bonding metal and rubber or other elastic materials are known in the art. The hardness or resiliency and thickness of rubber ring 16' are selected so that when the outer ring 13' is locked, the accumulator 11' delivers a restoring torque that corresponds to the torque of a camera of specific weight but opposite to it.

Preferably the cross section of the rubber ring 16' tapers or is thinner in the central area between inner ring 12' and outer ring 13'. This permits the relative angle of rotation obtainable between the inner and outer rings to be much greater as compared to a rubber ring of uniform cross section. This cross-sectional tapering of the rubber ring 16' is illustrated at 21 in FIGS. 2 and 3. Instead of a cross-sectional tapering 21, or in addition thereto, the element 16' can have transverse bores or apertures which give the element a greater flexibility.

In FIG. 3, balancer 10 is shown as having several accumulators 11' mounted such that the projections 14 mesh in groove 15 of the shaft 3. A small space or clearance 23 is maintained between rings 13 and stator 2.

Rings 13 of the individual accumulators 11' can be interlocked with the stator 2 independently from each other by suitable locking means or pins, such as means 20. Locking means 20 has a pin 24 mounted on stator 2 by support 25 and is held in the support 25 by spring 26. When spring 26 is relieved, lock pin 24 is disengaged and is not in contact with the outer ring 13 of the accumulator. Lock pin 24 has a collar 27 that in its resting position is pressed by spring 20 against the inner side of support 25 and held in this position. Support 25 also carries a lever 28 that has an eccentric 29 which acts on the outer end of the lock pin 24. By rotating lever 28 away from the position shown in dotted lines in FIG. 4 to the closed position illustrated, pin 24 is radially pushed into recess 19 in ring 13 of accumulator 11', when the tripod head is held in normal position and locks ring 13 to the stator, leaving ring 12 free to move with shaft 3 and rotor 4. The selected accumulator is thus engaged between the stator and rotor. Depending on the spring strength of the selected accumulator there is produced during movements of the rotor 4 a restoring torque that counterbalances the torque produced by the superposed camera.

In FIG. 3, balancer 10 has three independent accumulators with different spring rates constructed with three rings of rubber of different thicknesses. Each accumulator can be interlocked with the rotor by individual locking means 20 which produces when interlocked different restoring torques. In the simplest case all the elements 16' can have the same spring rates. Alternatively, with rubber disks of the same thickness, the spring rates can be made to differ according to the hardness or firmness of the rubber in each.

Instead of interlocking the individual accumulators with the stator by their own locking means 20, all of the lock pins of the individual accumulators can be associated with a common central operating handle 30, as shown in FIGS. 5 and 6. The central operating handle 30 is placed for rotation over cylindrical stator 4 and has in its inner periphery several cams 31. These cams 31 serve to press lock pins 24 into the recesses 19 of the accumulator when the operating handle 30 is rotated. By a planned placement of cams 31 on the inner surface of the central operating handle, one or more lock pins can be selectively engaged with their respective individual accumulators by proper positioning of the handle.

Alternatively to what has been illustrated, shaft 3 can be mounted in stator 2 so that rotor 9 pivots around the shaft. Then the accumulators must be selectively interlocked with the rotor instead of the stator.

What is claimed is:

1. An apparatus for counterbalancing the weight of an object during a pitch movement thereof, said apparatus having a stator, a rotor rotatable around said stator in the pitch direction and adpated to support said object, and an accumulator between said stator and rotor that exerts upon said rotor during a pitch movement a restoring torque opposite to the torque given by said object; the improvement comprising several independent accumulators placed between said stator and rotor and engaging means adapted to selectively operatively engage said several independent accumulators with said stator and rotor.

2. The apparatus of claim 1 wherein said accumulators each have a spring element comprising a coil spring positioned to effect said restoring torque.

3. The apparatus of claim 2 wherein said accumulators each have two spiral springs coiled in opposite directions.

4. The apparatus of claim 1 wherein said accumulators each comprise a rubber disk attached to inner and outer metal rings and adapted to effect said restoring torque when said outer ring is rotated relative to said inner ring.

5. The apparatus of claim 4 wherein said rubber disk is of reduced thickness in the mid portion thereof between said inner and outer rings.

6. The apparatus of claim 1 having a single control means adapted to be placed in selected positions and actuate various predetermined combinations of said engaging means.

7. An apparatus adapted to effect a controlled tilting movement of a camera comprising a support, a stator supported thereby, a rotor on said stator and adapted to support said camera and for rotation in the direction of tilting movement about said stator, a plurality of accumulators between said stator and rotor each adapted to exert a restoring torque opposite to that offered by said camera in its tilting movement, and means for selectively and independently engaging each said accumulator with said stator and rotor.

8. The apparatus of claim 1 wherein at least one of said accumulators offers a restoring force substantially different from that offered by the others.

9. The apparatus of claim 7 wherein at least one of said accumulators offers a restoring force substantially different from that offered by the others.

* * * * *